US012776117B2

(12) United States Patent
Xu et al.

(10) Patent No.: US 12,776,117 B2
(45) Date of Patent: Oct. 27, 2026

(54) OBJECT DETECTION USING DEEP LEARNING

(71) Applicant: Rapsodo Pte. Ltd., Singapore (SG)

(72) Inventors: Dejiang Xu, Singapore (SG); Kelvin Soon Keat Yeo, Singapore (SG); Batuhan Okur, Singapore (SG)

(73) Assignee: Rapsodo Pte. Ltd., Singapore (SG)

( * ) Notice: Subject to any disclaimer, the term of this patent is extended or adjusted under 35 U.S.C. 154(b) by 247 days.

(21) Appl. No.: 18/810,636

(22) Filed: Aug. 21, 2024

(65) Prior Publication Data

US 2026/0057633 A1 Feb. 26, 2026

(51) Int. Cl.

*G06K 9/00* (2022.01)
*G06T 7/60* (2017.01)
*G06V 10/25* (2022.01)
*G06V 10/764* (2022.01)

(52) U.S. Cl.

CPC ................ *G06V 10/25* (2022.01); *G06T 7/60* (2013.01); *G06V 10/764* (2022.01); *G06T 2207/20084* (2013.01); *G06V 2201/07* (2022.01)

(58) Field of Classification Search

USPC ....... 382/100, 103, 106–107, 108, 155, 162, 382/168, 181, 254, 286–291, 224, 305, 382/312, 199; 700/91

See application file for complete search history.

(56) References Cited

U.S. PATENT DOCUMENTS 8,951,138 B2 2/2015 Kiraly et al.
9,171,211 B2 10/2015 Keat et al.
11,686,941 B2 * 6/2023 Mohan ................. G02B 27/017 382/199
2013/0304417 A1 11/2013 Mooney et al.
2014/0342844 A1 11/2014 Mooney
2018/0137642 A1 5/2018 Malisiewicz et al.
2018/0140898 A1 5/2018 Kasha
2018/0272221 A1 9/2018 Sundararajan et al.
2020/0282283 A1 9/2020 Xu et al.
2020/0298092 A1 9/2020 Okur et al.

(Continued)

FOREIGN PATENT DOCUMENTS

CN 109886307 A 6/2019
CN 111814741 A 10/2020

(Continued)

OTHER PUBLICATIONS

Notice of Allowance in Japanese Appln. No. 2024-506252, mailed on Aug. 6, 2024, 5 pages (with English translation).

(Continued)

*Primary Examiner* — Seyed H Azarian

(74) *Attorney, Agent, or Firm* — FISH & RICHARDSON P.C.

(57) ABSTRACT

Embodiments are disclosed for object detection using deep learning. In some embodiments, a method comprises: extracting, with a machine learning model, a first region from an image; pooling, with the machine learning model, the first region to a second region that is smaller than the first region; predicting, with the machine learning model, a geometric center and radius of a blob of pixels in the second region and a confidence score associated with the predicting; and classifying, with the machine learning model, the blob of pixels as a ball based on the confidence score.

21 Claims, 8 Drawing Sheets

(56) References Cited

U.S. PATENT DOCUMENTS

| | | | | |
|---|---|---|---|---|
| 2021/0170257 | A1 | 6/2021 | Tuxen | |
| 2021/0178244 | A1 | 6/2021 | Okur et al. | |
| 2021/0220718 | A1* | 7/2021 | Tuxen | A63B 69/3623 |
| 2022/0026531 | A1 | 1/2022 | Wu et al. | |
| 2022/0233939 | A1 | 7/2022 | Oh et al. | |
| 2022/0291328 | A1 | 9/2022 | Ozturk et al. | |
| 2022/0301309 | A1* | 9/2022 | Lee | G06F 18/2413 |
| 2022/0343514 | A1 | 10/2022 | Jayaram et al. | |
| 2023/0070986 | A1 | 3/2023 | Okur et al. | |
| 2023/0218971 | A1* | 7/2023 | Hall | A63B 71/0605 700/91 |
| 2023/0343001 | A1* | 10/2023 | Okur | G06T 11/23 |
| 2023/0364468 | A1 | 11/2023 | Okur et al. | |
| 2024/0420346 | A1* | 12/2024 | Messina | G06T 7/251 |
| 2025/0161750 | A1 | 5/2025 | Xu et al. | |
| 2025/0325874 | A1 | 10/2025 | Okur et al. | |

FOREIGN PATENT DOCUMENTS

| | | |
|---|---|---|
| JP | 2008-305372 A | 12/2008 |
| JP | 2015-517889 A | 6/2015 |

OTHER PUBLICATIONS

Tebbe et al., "Spin Detection in Robotic Table Tennis," 2020 IEEE International Conference on Robotics and Automation (ICRA), May 31, 2020-Aug. 31, 2020, pp. 9694-9700.

Chen et al., "Joint Time-Frequency Analysis for Radar Signal and Image Processing," IEEE Signal Processing Magazine, Mar. 31, 1999, 16(2):81-93.

Extended European Search Report in European Appln. No. 22863729.4, mailed on Mar. 28, 2025, 11 pages.

International Preliminary Report on Patentability in International Appln. No. PCT/IB2022/058025, mailed on Mar. 14, 2024, 7 pages.

International Search Report and Written Opinion in International Appln. No. PCT/SG2024/050720, mailed on Jan. 20, 2025, 9 pages.

Aggarwal, "YOLO Explained," Analytics Vidhya, Dec. 27, 2020, retrieved on Aug. 26, 2024, retrieved from URL<https://medium.com/analytics-vidhya/yolo-explained-5b6f4564f3>, 18 pages.

Bhatt, "Deep Learning—Understanding Receptive field in Computer Vision," Feb. 6, 2020, retrieved on Aug. 21, 2024, retrieved from URL<https://www.linkedin.com/pulse/deep-learning-understanding-receptive-field-computer-n-bhatt/>, 10 pages.

Ding et al., "Scaling Up Your Kernels to 31x31: Revisiting Large Kernel Design in CNNs," CoRR, Submitted on Apr. 2, 2022, arXiv:2203.06717v4, 16 pages.

International Search Report and Written Opinion issued in corresponding application No. PCT/IB2022/058025, dated Apr. 6, 2023.

Redmon et al., "You Only Look Once: Unified, Real-Time Object Detection," CoRR, Submitted on Jun. 8, 2015, arXiv:1506.02640v1, 9 pages.

Wang et al., "YOLOv10: Real-Time End-to-End Object Detection," CoRR, Submitted on May 23, 2024, arXiv:2405.14458v1, 18 pages.

International Search Report and Written Opinion in International Appln. No. PCT/SG2025/050558, mailed on Aug. 12, 2025, 9 pages.

Kok et al., "Occluded apples orientation estimator based on deep learning model for robotic harvesting," Computers and Electronics in Agriculture, Feb. 26, 2024, 219:108781, 12 pages.

Kukleva et al., "Utilizing Temporal Information in Deep Convolutional Network for Efficient Soccer Ball Detection and Tracking," Computer Vision and Pattern Recognition, Submitted on Sep. 6, 2019, arXiv:1909.02406v2, 14 pages.

* cited by examiner

OBJECT DETECTION USING DEEP LEARNING

TECHNICAL FIELD

This disclosure relates generally to object detection, and in particular using deep learning to detect objects in computer vision applications.

BACKGROUND

Object detection techniques have evolved over the years, and in particular the application of deep neural networks to object detection to improve the accuracy of detection. In general, an object detection framework can be classified as single-stage object detection or two-stage object detection. One commonly used single-stage object detection is the You Only Look Once (YOLO) detector.

YOLO uses a feature map on an image to divide the image into an n×n grid. In object localization, bounding boxes are placed on the image, and in object segmentation, a confidence score is given to the bounding boxes. Finally, a class probability mapping is done to determine the type of object. YOLO models may be further classified into two categories: anchor-free YOLO and anchor-based YOLO. Anchor-free YOLO directly predicts the bounding box coordinates thereby eliminating the need for predefined anchor boxes. In contrast, anchor-based YOLO models rely on predefined anchor boxes to predict bounding boxes around objects.

Another known single-stage object detection algorithm is Single Shot Detector (SSD), which divides the images into grid cells, where each grid cell is responsible for detecting the object in a region of interest (ROI). A boundary box is then placed in each grid cell and a probability score is used to determine the type of object.

For two-stage object detection, the object detection task is divided into two stages: extract the ROI and classify and regress the ROI. Some examples of two-stage object detection networks include but are not limited to: region based convolutional neural network (R-CNN), Fast-RCNN, Faster-RCNN and Mask-RCNN.

Despite their advancements, both single-stage and two-stage object detection still face some challenges. One significant challenge is the inability of these object detectors to detect occluded objects accurately. When parts of objects are obscured, the detection accuracy of both single-stage and two-stage object detectors is significantly reduced.

SUMMARY

Embodiments are disclosed for object detection using deep learning.

In some embodiments, a method comprises: utilizing at least one processor to execute computer code that performs the steps of: extracting, with a machine learning model, a first region from an image; pooling, with the machine learning model, the first region to a second region that is smaller than the first region; predicting, with the machine learning model, a geometric center and radius of a blob of pixels in the second region and a confidence score associated with the predicting; and detecting, with the machine learning model, the blob of pixels as a ball based on the geometric center and radius and the confidence score.

In some embodiments, the image is an image of a ball obscured by an object.

In some embodiments, the detecting includes classifying the blob of pixels as a ball in the first region based on the confidence score and localizing the ball in the first region based on the predicted geometric center coordinates and radius.

In some embodiments, the first region is 128 by 128 pixels in size.

In some embodiments, the second region is 7 by 7 pixels in size, where each pixel is associated with an x-coordinate of the geometric center, a y-coordinate of the geometric center, the radius and the confidence score.

In some embodiments, the blob of pixels is classified as a ball if the confidence score meets or exceeds a threshold level.

In some embodiments, the machine learning model is trained on annotated ground truth images having a labelled circular region defined by a ground truth geometric center and radius.

In some embodiments, the machine learning model includes at least one regression neural network.

In some embodiments, the at least one regression neural network comprises a plurality of units, and each unit comprises a number of convolutional layers where each convolutional layer is followed by an activation function.

In some embodiments, the machine learning model is trained on images of balls partially obscured by various objects under various conditions.

Other embodiments are directed to systems, apparatuses and non-transitory, computer-readable storage mediums.

Particular embodiments described herein provide one or more of the following advantages. Existing object detection applications generally use a Convolution Neural Network (CNN)-based architecture, such as YOLO object detectors which require Non-Maximum Suppression (NMS) for post-processing. Further, calculating the Intersection Over Union (IoU) based on a confidence score during the NMS process causes instability in both speed and accuracy.

Unlike these existing object detection applications, the disclosed embodiments use a global field/region and machine learning model to directly find an object for, e.g., a ball in the image based on center coordinates and a radius from ball images that have been trained with a machine leaning model (e.g., a deep learning network).

DETAILED DESCRIPTION

The disclosed embodiments detect an object even when the object of interest is occluded by another object. This is achieved by a machine learning model that has been trained to predict occluded balls in images. In some embodiments, a global region is selected from an input image and pooled into an array of feature points. The array of feature points is input into the machine learning model, which predicts a radius (r) and geometric center coordinates (x, y) in two-dimensional (2D) space, where x is the center coordinate in the x-axis and y is the center coordinate in the y-axis. The predicted ball parameters are fitted to ground truth ball parameters to determine a confidence score for the predicted ball parameters. The confidence score is compared to a threshold value to classify a blob of pixels in the input image as a ball or not as a ball.

Figure 1:
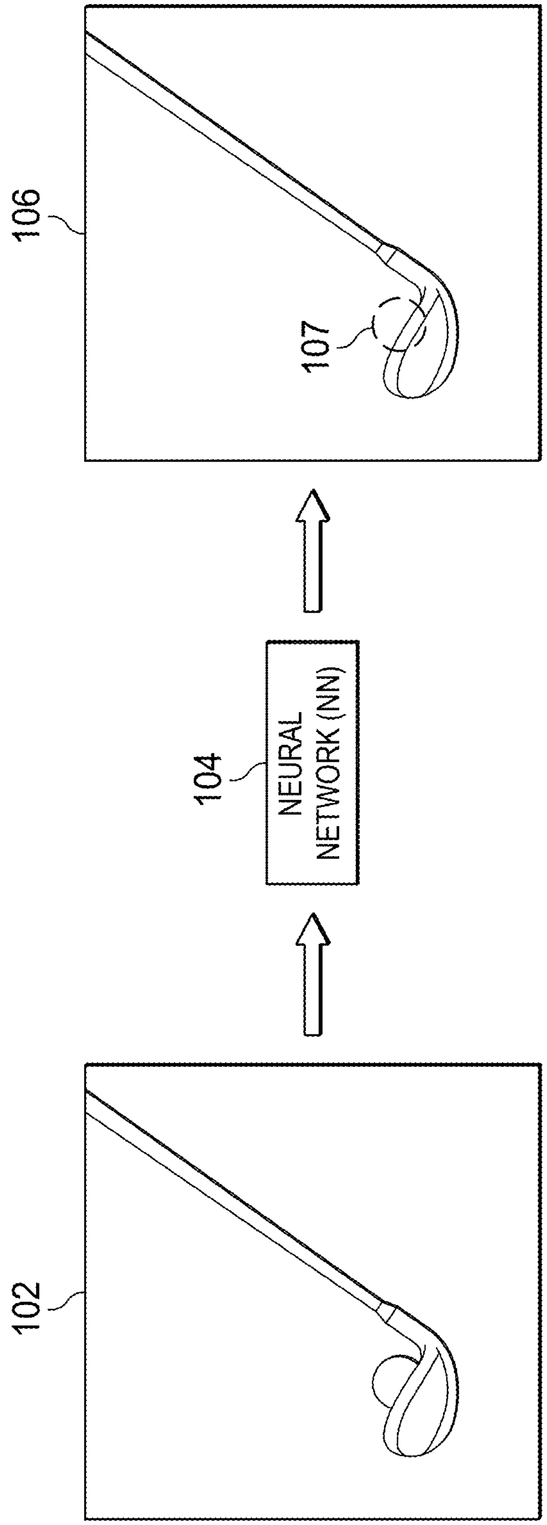
FIG. 1 illustrates a machine learning model, e.g., Neural Network (NN) for receiving an image of a ball occluded by another object, predicting ball parameters and classifying the ball based on the predicted ball parameters, according to one or more embodiments.

FIG. 1 illustrates a machine learning model for receiving an image of a ball occluded by another object, predicting ball parameters and classifying the ball in the image based on the predicted ball parameters, according to one or more embodiments. In the example shown, input image 102 includes a golf ball which is partially occluded by a golf club head. Other embodiments can predict other types of balls, including but not limited to a cricket ball, baseball, tennis ball or basketball.

Referring to FIG. 1, input image 102 is input to machine learning model 104, which generates output image 106 that identifies ball 107 as shown. An example machine learning model 104 is a neural network as described in reference to FIG. 7.

Existing object detection algorithms, such as YOLO and Faster R-CNN, struggle to detect and identify a complete shape of an object when it is partially occluded. For example, when an image contains two objects where the first object is partially visible as the first object is occluded by the second object. When applying YOLO v10 to the image, YOLO v10 uses image localization by drawing bounding boxes around the first object and the second object. Since the first object is occluded by the second object, information (e.g. feature points) that are available to detect and identify the first object is based on the non-occluded portion of the first object. To improve upon these existing algorithms, the disclosed embodiments extract a first region of pixels from input image 102 (hereinafter also referred to as "global region") and pool the global region to a smaller second region (e.g., geometric center and radius). Machine learning model 104 detects, where detects include classification and localization of a blob of pixels in the second region as containing a ball or not containing a ball (e.g., two classes) by fitting the predicted ball parameters to ground truth ball parameters and detecting the blob of pixels as a ball if the confidence score meets or exceeds a threshold value.

In some embodiments, the confidence score is a probability value between a range of 0.0 and 1.0, where the higher the probability value, the higher the confidence score, as described more fully in reference to FIG. 6. In some embodiments, more than two classes can be used, such as, for example: Ball, No Ball and Unsure. The threshold value can be used to adjust the sensitivity of the detection.

In some embodiments, the first (global) region is 128×128 pixels and the second region is 7×7 pixels. By having a larger global region, there is more information (features) for object detection. However, having a larger global region slows down the processing time. In some embodiments, pooling the larger global region from 128×128 pixels to 7×7 pixels and processing the pooled region having 7×7 pixels speeds up the processing time. Pooling can be accomplished using a kernel with an appropriate size. It is to be understood that these 128×128 and 7×7 regions sizes are only examples. In practice, region sizes can be determined empirically to strike a balance between speed and accuracy. Although machine learning model 104 is described above in relation to detecting balls, machine learning model 104 can be trained to detect any object that has a rigid shape, such as triangles, squares, cylinders, etc. The predicted parameters can be related mathematically to these particular objects, such as base and height for predicting triangles in images.

The pooling operators can include a fixed-shape window that is slid over all regions in the input according to a stride value, computing a single output for each location traversed by the fixed-shape window. The pooling operator can calculate either a maximum (Max-Pooling) or an average value over adjacent pixels in the window to obtain an image with better signal-to-noise ratio. The pooling window can start from the upper-left of the global region and slide across the global region from left to right and top to bottom. At each location that the pooling window traverses, the maximum or average value of the subtensor in the window is calculated depending on whether max or average pooling. Additionally, there may be more than one global region in the input image 102, and the global regions may intersect and overlap one another.

Figure 2:
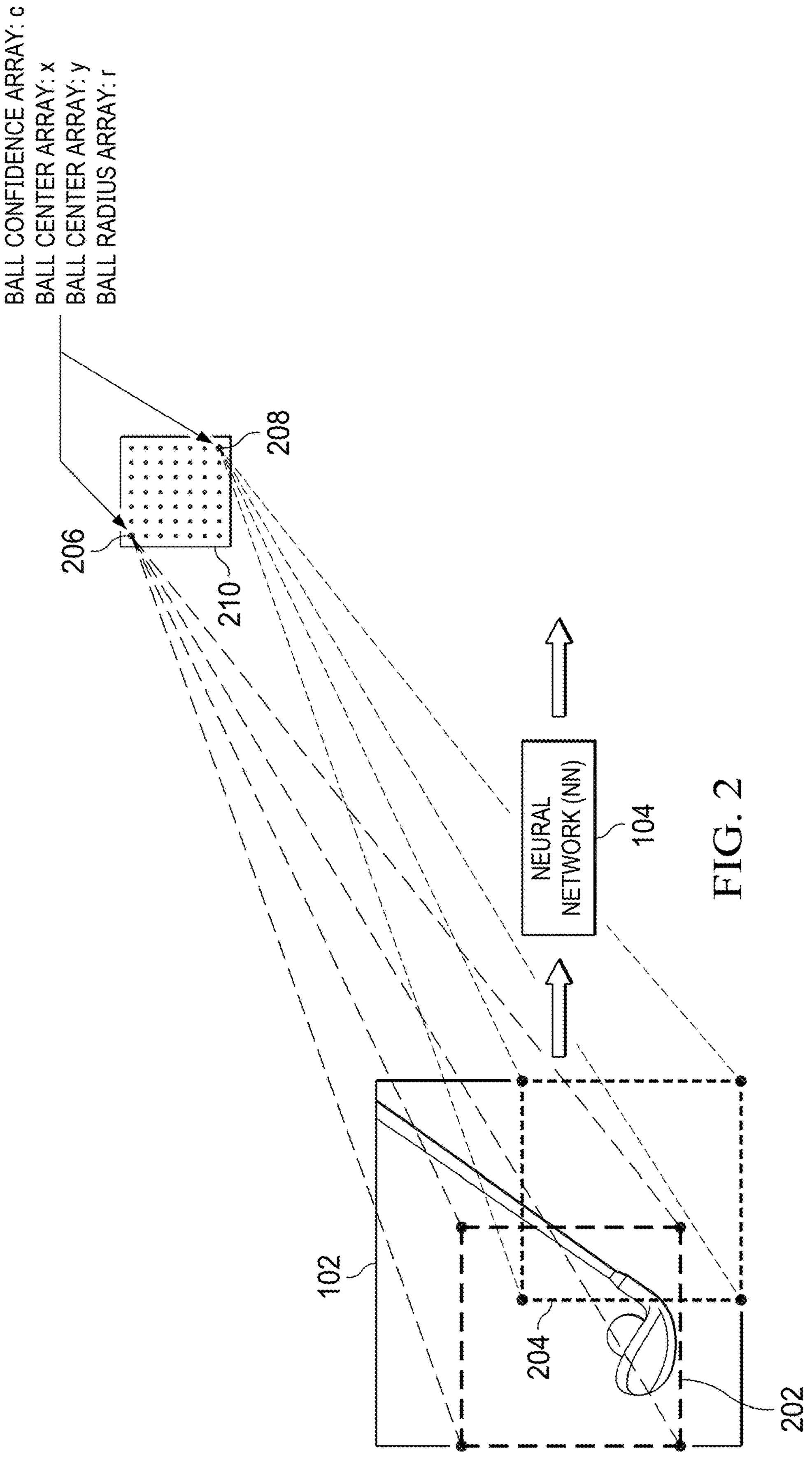
FIG. 2 illustrates an example of an object detection method according to one or more embodiments.

FIG. 2 illustrates an example of an object detection method, according to one or more embodiments. In some embodiments, using machine learning model 104 (a neural network in this example), global regions 202, 204 are extracted from input image 102. The global regions 202, 204 each are pooled into a smaller region 210 of pixels, where each pixel in the smaller region 210 represents a global region. In some embodiments, each pixel in the smaller region 210 has four dimensions including the ball geometric center coordinates (x, y), the ball radius and a confidence score. In the example shown, global regions 202, 204 are shown intersecting one another in input image 102, and are pooled into smaller region 210 which includes 49 (7×7) pixels, where pixels 206, 208 correspond to global regions 202, 204, respectively. Each pixel 206, 208 is associated with geometric center coordinates (x, y), radius (r) predicted by Neural Network (NN) 104, and a confidence score computed as described in reference to FIG. 6. In some embodiments, the Neural Network (NN) including the NN 104 may be a Convolutional Neural Network (CNN) 104.

Figure 3:
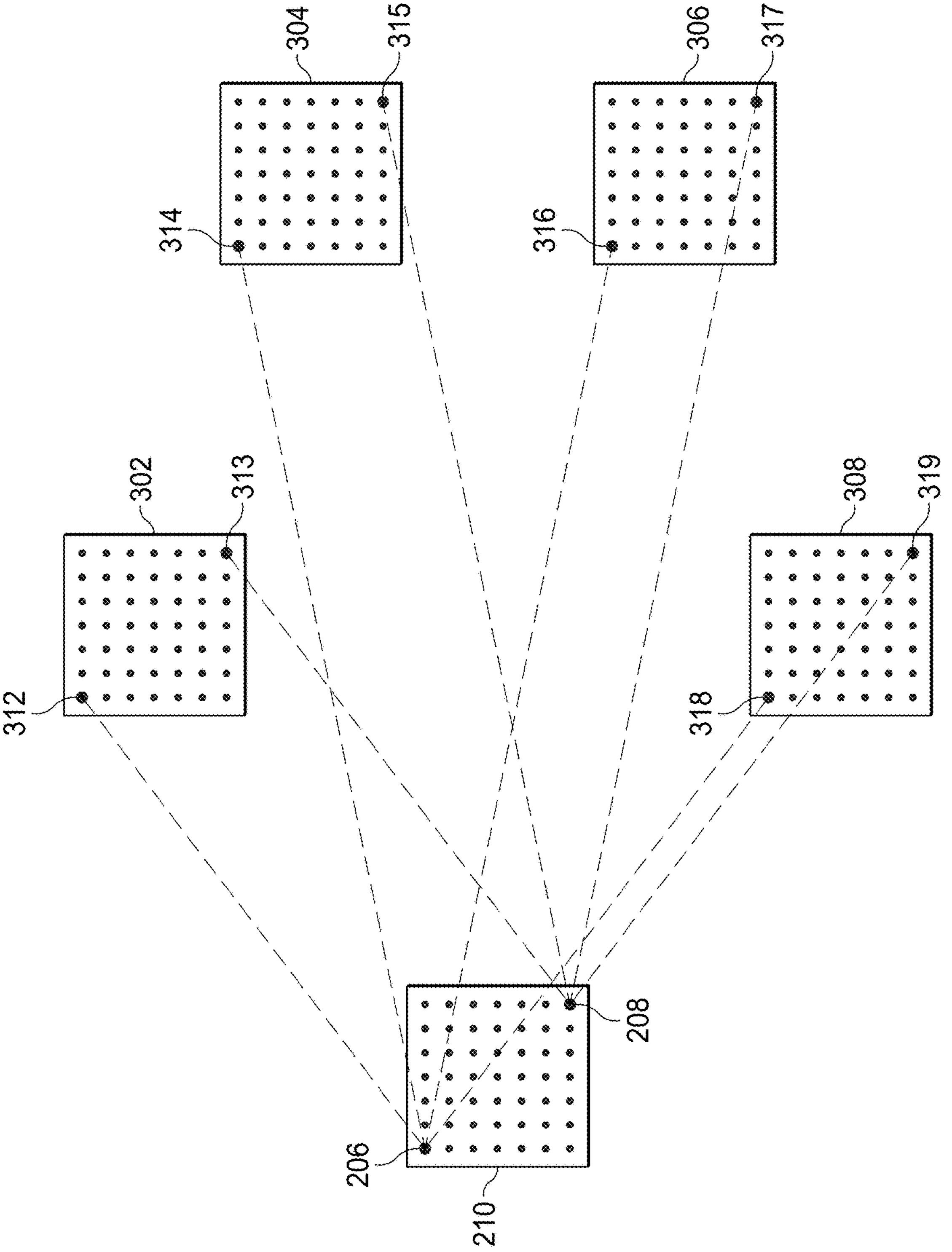
FIG. 3 illustrates the dimensions of the outputs of the object detection method, according to one or more embodiments.

FIG. 3 is a schematic diagram that illustrates the dimensions of the outputs of the object detection method, according to one or more embodiments. In this example, pixel 206 in the pooled smaller region 210 corresponds to a geometric center in the x-coordinate 312 in region 302, a geometric center in the y-coordinate 314 in global region 304, a radius coordinate 316 in region 306 and a confidence score 318 in region 308. Subsequently, the pixel 208 in the pooled smaller region 210 corresponds to a geometric center x-coordinate 313 in region 302, a geometric center y-coordinate 315 in region 304, a radius coordinate 317 in region 306 and a confidence score 319 in region 308.

Figure 4:
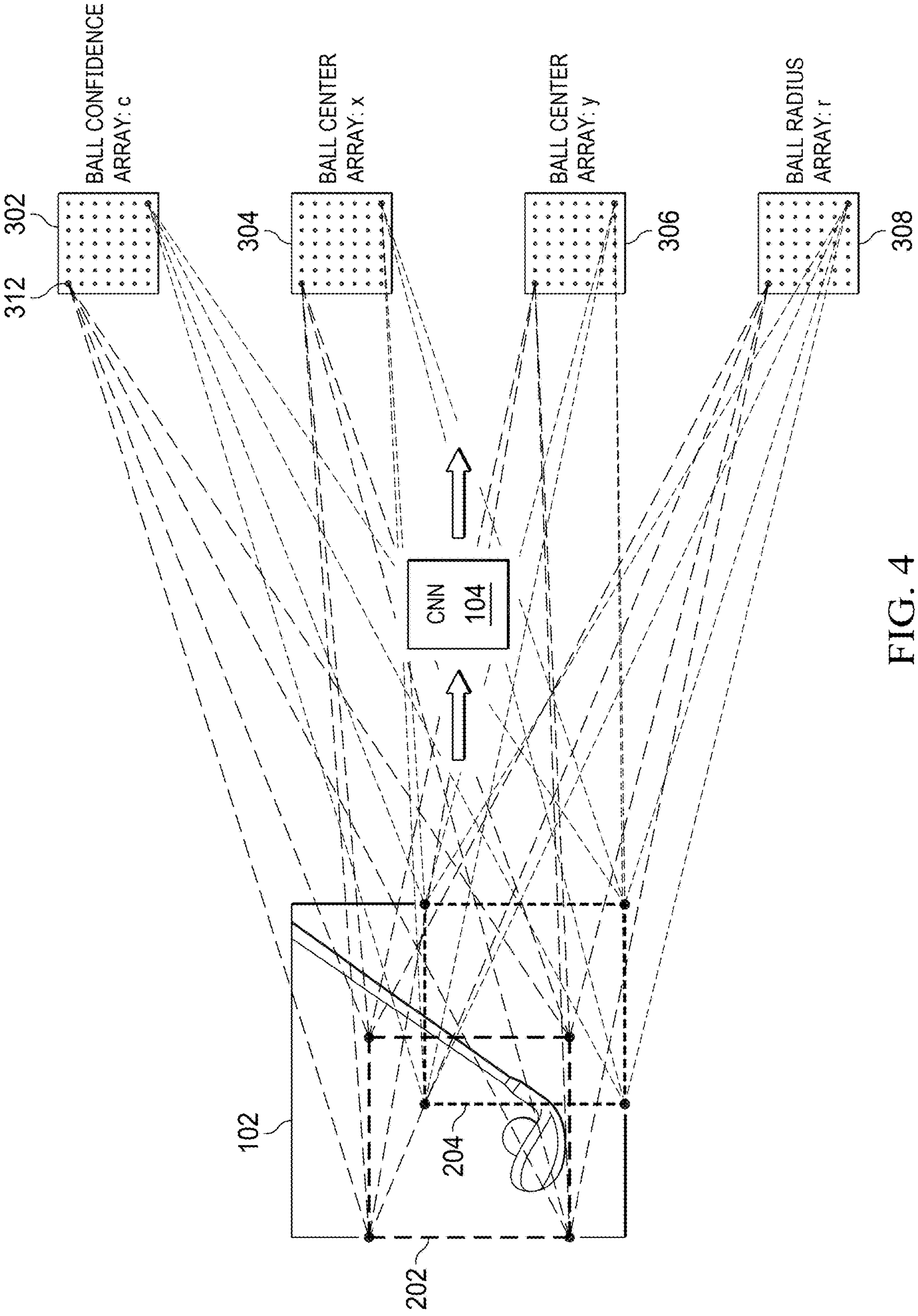
FIG. 4 illustrates predicting ball parameters using an object detection method, according to one or more embodiments.

FIG. 4 illustrates predicting ball parameters using an object detection method, according to one or more embodiments. In this example, regions 202, 204 are of size of 128×128 pixels each, and regions 202, 204 are determined based on the type of CNN 104. Different CNNs will have regions (receptive fields) of different sizes. After passing through the CNN 104 as illustrated in FIG. 4, smaller regions are formed, which are fully decided by the convolutional filter (kernel size, stride, padding, etc.), and the pooling layer (kernel size, stride), etc. In this example, the input is of 128×128 pixel size, and the output of CNN 104 is four smaller regions 302, 304, 306, 308, each region having a pixel size of 7×7, where the pixels in each region corresponds to a confidence score 302, ball center geometric coordinate in the x-axis 304, ball center geometric coordinate in the y-axis 306 and a ball radius (r) 308. Different pixels in the four smaller regions 302, 304, 306, 308 (shown as pixel arrays) correspond to different global fields 202, 204 respectively. In this example, the value of first pixel 312 in ball confidence array 302 is greater than a preset threshold confidence score, which means that global region 202 contains a ball. The corresponding pixels in arrays 304, 306 and 308 are values used for determining a local position, geometric center coordinates and radius of the ball in input image 102, respectively.

If YOLO was used for ball detection, YOLO would form a grid around the region of interest (ROI) in input image 102. In each grid cell, YOLO would determine if there was a ball in that grid cell and thereafter based on the probability, YOLO would form boundary boxes on the areas with the highest probability of containing the ball. By contrast, the disclosed embodiments use a down sampled global region 202 to determine if a ball exists or does not exist from a predicted geometric center (x, y) and radius (r) and a confidence score output by machine learning model 104.

Figure 5:
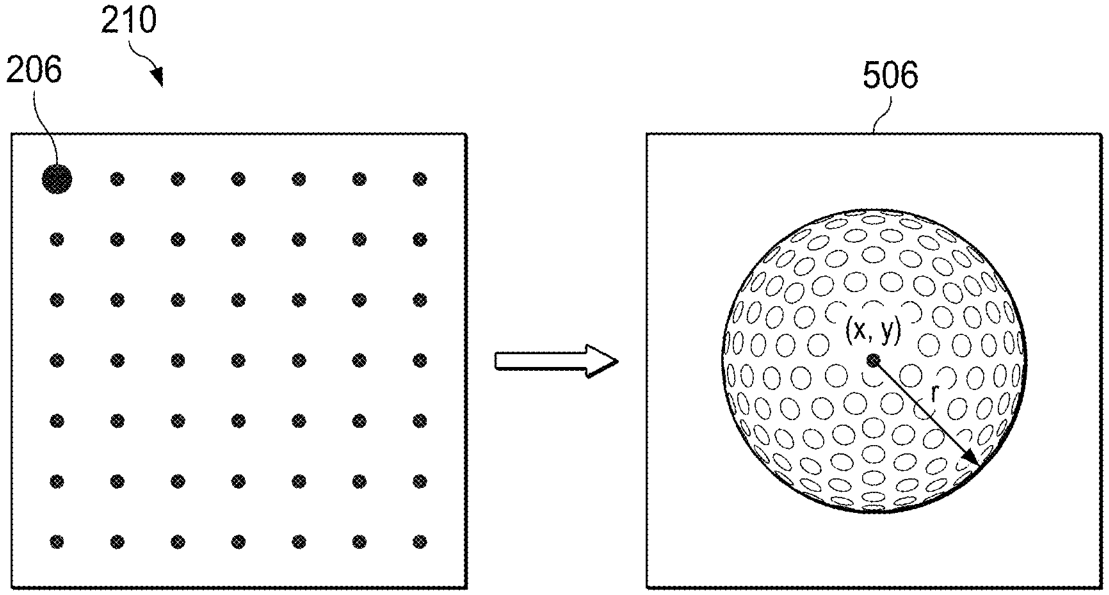
FIG. 5 shows predicted ball parameters representing an image of a ball, according to one or more embodiments.

FIG. 5 further illustrates predicted ball parameters representing an image of a ball, according to one or more embodiments. In particular, in region 210, if the pixel 206 is of a confidence score that meets or exceeds a threshold value which has been determined to be acceptable, in this example 98% or 0.98, then the output of machine learning model is geometric center coordinates (x, y) and radius (r) which represents an image of the ball 506.

Figure 6A:
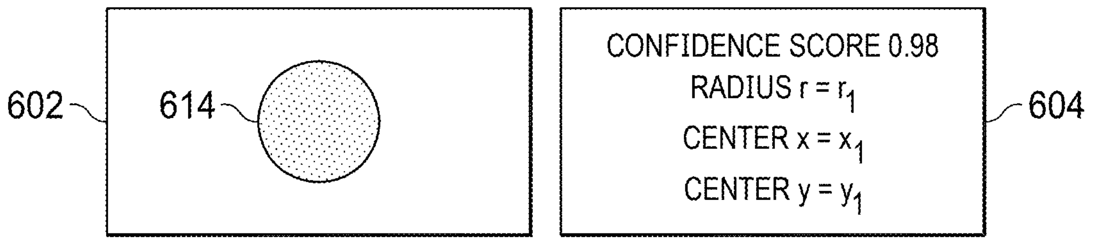
FIGS. 6A-6C illustrate fitting predicted ball parameters to ground truth ball parameters using a confidence score, according to one or more embodiments.
Figure 6B:
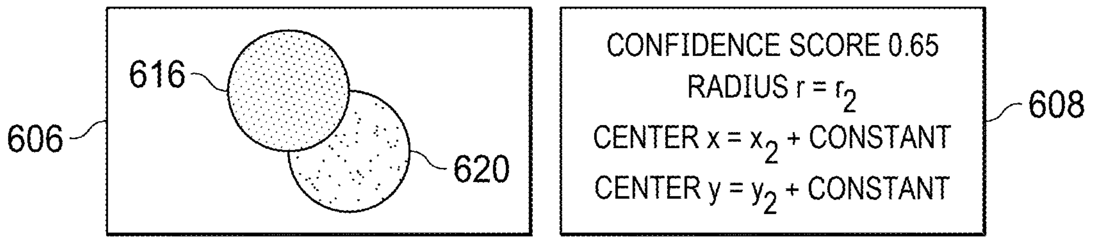
Figure 6C:
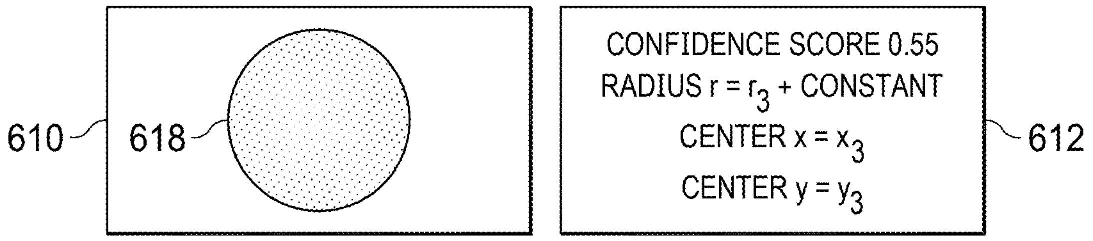

FIGS. 6A to 6C further illustrate fitting predicted ball parameters to ground truth ball parameters using a confidence score, according to one or more embodiments. In this example, a series of output images 602, 606, 610 from machine learning model 104 is shown. Each output image is based on a different global region extracted from input image 102.

FIG. 6A illustrates ball image 602 that has predicted ball parameters 604 comprising predicted geometric center coordinates and radius ($x_1$, $y_1$, $r_1$), which are fitted to ground truth ball parameters (x, y, r). In this example, $x=x_1$, $y=y_1$ and $r=r_1$, results in a high confidence score of 0.98 or 98% probability of being a ball. In this example the predicted ball 614 is of the same size as the ground truth ball (not shown) as determined by the machine learning model 104.

FIG. 6B illustrates ball image 606 that has predicted ball parameters 608 comprising a predicted geometric center coordinates and radius ($x_2$, $y_2$, $r_2$), which are fitted to ground truth ball parameters (x, y, r). In this example, $x=x_2+$constant, $y=y_2+$constant and r=12, results in a confidence score of 0.65 or 65% probability of being a ball. In this example, the predicted confidence score is lower than the acceptable confidence score for ball image 602 because the geometric center is offset from the ground truth geometric center by some constant (prediction error), as the predicted ball 616 is off-center from the ground truth ball 620.

FIG. 6C illustrates ball image 610 that has predicted ball parameters 612 comprising a predicted geometric center and radius ($x_3$, $y_3$, $r_3$), which are fitted to ground truth ball parameters (x, y, r). In this example, $x=x_3$, $y=y_3$ and $r=r_3+$constant, resulting in a confidence score of 0.55 or 55% probability of being a ball. In this example, the confidence score is lower than the confidence scores for ball images 602 and 606 because the radius has a different length than the ground truth radius by some constant (prediction error) as the predicted ball 618 having a larger radius than the ground truth ball (not shown), whereby the predicted ball 618 appears to eclipse the ground truth ball (not shown).

In some embodiments, the fitting includes determining differences between the predicted ball parameters and the ground truth parameters and comparing those differences to a threshold value. If the difference is less than or equal to the threshold value, the predicted and ground truth ball parameters are considered to match. Based on the matches, a confidence score can be assigned to the prediction. That is, the closer the predicted ball parameters are to the ground truth parameters the higher the confidence score.

Figure 7:
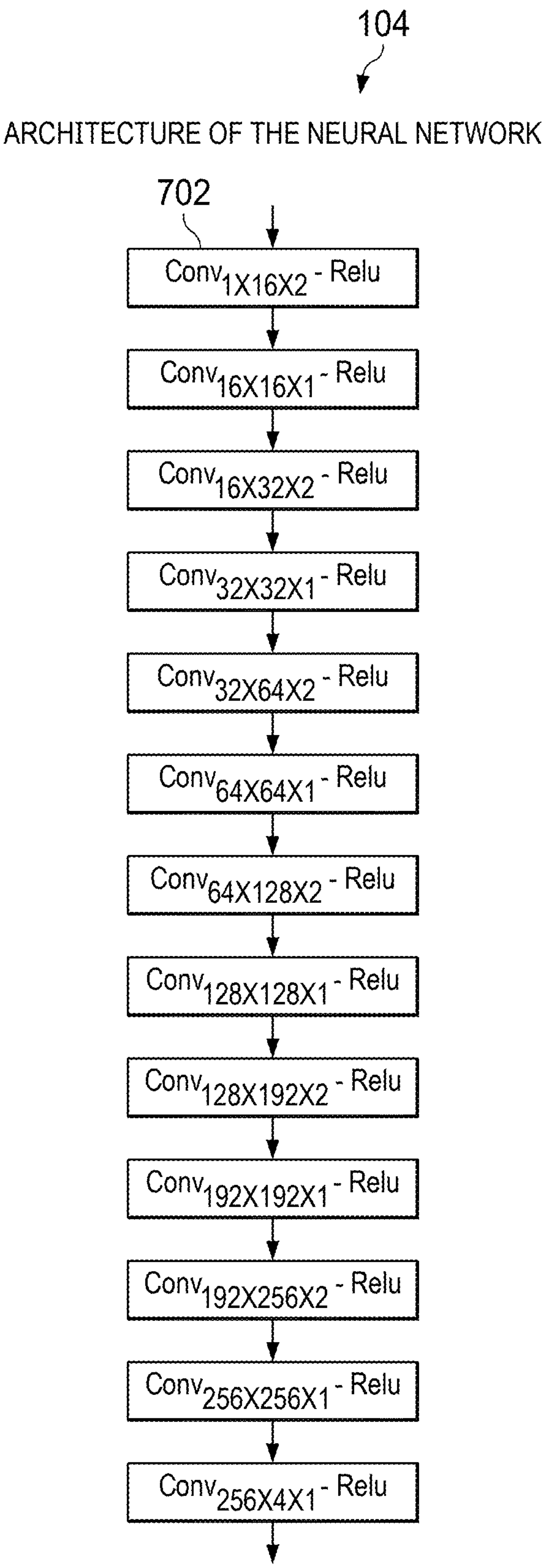
FIG. 7 illustrates exemplary architecture of a neural network for detecting a ball, according to one or more embodiments.

FIG. 7 illustrates an exemplary architecture of a neural network (NN) 104 for detecting a ball, according to one or more embodiments. In some embodiments, network 104 is a CNN comprising a number of convolutional layers with each layer 702 followed by an activation function, such as a rectified linear unit (ReLU) or other suitable activation function. As described above, a first or global region is extracted from an input image and pooled into a second smaller region to reduce processing time. The second smaller region is converted into an array of feature points (pixels) that are input into NN 104, which is trained to predict ball parameters, such as the geometric center coordinates of the ball and its radius. NN 104 also produces a confidence score which is used to fit the predicted ball parameters to ground truth ball parameters, as described in reference to FIG. 6. If the confidence score meets or exceeds a specified threshold value (e.g., a specified probability value), a ball is detected. NN 104 can be trained on actual images of obscured balls at various orientations and lighting conditions. In some embodiments, the training images can include augmented actual images of obscured balls or synthetic images of obscured balls. For clarity, the term "obscured ball" as used herein refers to a ball that is partially occluded by another object. Non-limiting examples of the obscured ball include golf ball that is partially occluded by a golf club head or a baseball that is partially occluded by a baseball bat. In some embodiments, the machine learning model is trained on annotated ground truth images having a labelled circular region defined by a ground truth geometric center and radius.

Figure 8:
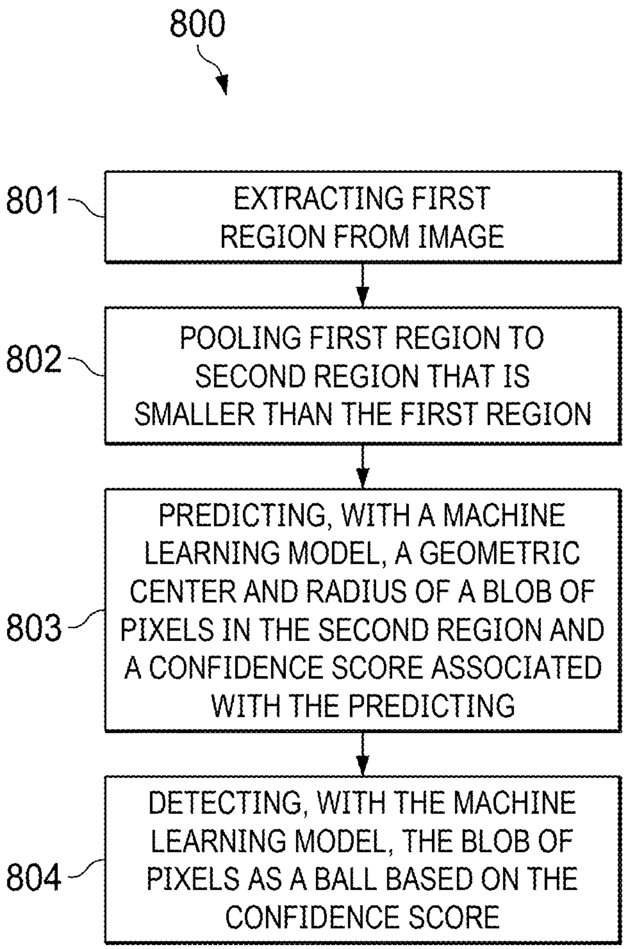
FIG. 8 is a flow diagram of a process of detecting a ball in an image using deep learning, according to one or more embodiments.

FIG. 8 is a flow diagram of process 800 of detecting a ball in an image, according to one or more embodiments. Process 800 can be implemented by, for example, system 900 shown in FIG. 9.

Process 800 includes extracting, with a machine learning model, a first (global) region from an image (801); pooling, with the machine learning model, the first region to a second region that is smaller than the first region (802); predicting, with the machine learning model, a geometric center and radius of a blob of pixels in the second region and a confidence score associated with the predicting (803); and detecting, with the machine learning model, the blob of pixels as a ball based on the confidence score (804). Each of these steps was previously described in reference to FIGS. 1-7.

After a ball is detected, in some embodiments, the detected ball is tracked by one or more cameras and/or other sensors (e.g., Radar) in a ball launch monitoring system, such as a golf ball monitoring system used for training golfers. For example, to determine a ball's trajectory, the disclosed object detection can be used to identify a ball in a sequence of images, and then apply a curve fitting algorithm to detected positions of the ball in the series of images to establish a trajectory of the ball. Another example application for the disclosed ball detection can be for camera calibration. By using the disclosed embodiments, the detected ball can be used as a reference point in the image to obtain intrinsic and extrinsic parameters of the camera during the calibration. Another example application for ball detection is measuring parameters of a ball in flight. After locating the ball in a series of images, a spin measurement algorithm can be applied to obtain spin parameters (e.g., spin rate and spin axis), such as described in U.S. patent application Ser. No. 18/517,731, for "Determination of Spin Rate and Spin Axis of a Ball in Flight," filed on Nov. 22, 2023, which is herein incorporated by reference in its entirety.

Figure 9:
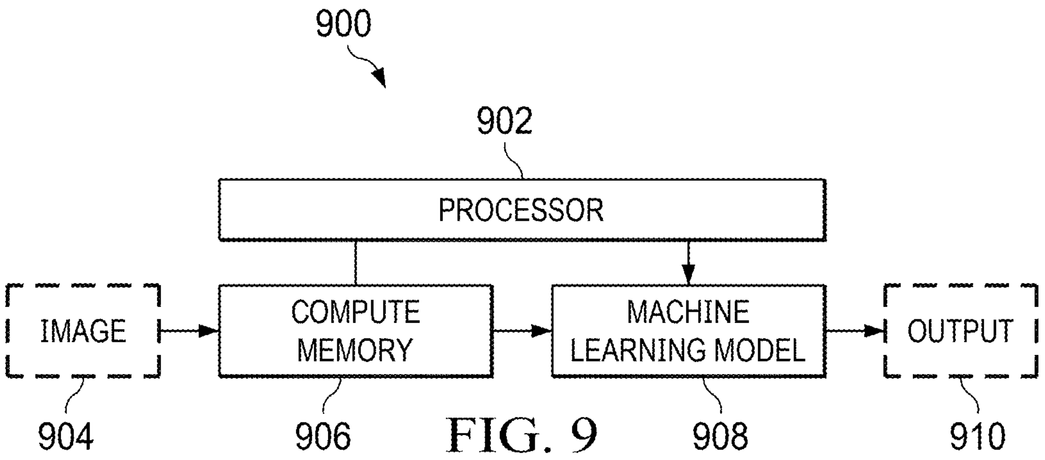
FIG. 9 illustrates a system for ball detection using deep learning, according to one or more embodiments.

FIG. 9 illustrates system 900 for predicting a ball from an image, according to one or more embodiments. System 900 includes at least one processor 902, compute memory 906 and machine learning model 908. Input image 904 is input to compute memory 906 (e.g., a flash memory) so that machine learning model 908 (e.g., stored in a storage medium) can be implemented in compute memory 906 to operate on input image 904 as described in reference to FIGS. 1-8. Output 910 includes the predicted ball parameters (geometric center coordinates, radius), a confidence score and a class decision (e.g., ball or no ball). System 900 described above is one example embodiment of a suitable processing architecture. Other suitable processing architectures can also be used to implement the embodiments described herein.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A method comprising:

utilizing at least one processor to execute computer code that performs the steps of:

extracting, with a machine learning model, a first region from an image;

pooling, with the machine learning model, the first region to a second region that is smaller than the first region;

predicting, with the machine learning model, a geometric center and radius of a blob of pixels in the second region and a confidence score associated with the predicting; and detecting, with the machine learning model, the blob of pixels as a ball based on the geometric center and radius and the confidence score, wherein the detecting includes:

classifying the blob of pixels as a ball in the first region if the confidence score meets or exceeds a threshold level; and localizing the ball in the first region based on the predicted geometric center coordinates and radius.

2. The method of claim 1, wherein the image is an image of a ball obscured by an object.

3. The method of claim 1, wherein the first region is 128 by 128 pixels in size.

4. The method of claim 1, wherein the second region is 7 by 7 pixels in size, wherein each pixel of the second region is associated with an x-coordinate of the geometric center, a y-coordinate of the geometric center, the radius and the confidence score.

5. The method of claim 1, wherein the machine learning model is trained on annotated ground truth images having a labelled circular region defined by a ground truth geometric center and radius.

6. The method of claim 1, wherein the machine learning model includes at least one regression neural network.

7. The method of claim 6, wherein the at least one regression neural network comprises a plurality of units, and each unit of the plurality of units comprises a number of convolutional layers wherein each convolutional layer is followed by an activation function.

8. The method of claim 1, wherein the machine learning model has been trained on images of balls partially obscured by various objects under various conditions.

9. A system comprising:

memory;

at least one processor to execute computer code for:

extracting, with a machine learning model, a first region from an image;

pooling, with the machine learning model, the first region to a second region of the image that is smaller than the first region;

predicting, with the machine learning model, a geometric center and radius of a blob of pixels in the second region and a confidence score associated with the predicting; and detecting, with the machine learning model, the blob of pixels as a ball based on the geometric center, the radius and the confidence score, wherein the detecting includes:

classifying the blob of pixels as a ball in the first region if the confidence score meets or exceeds a threshold level; and localizing the ball in the first region based on the predicted geometric center coordinates and radius.

10. The system of claim 9, wherein the image comprises an image of a ball obscured by an object.

11. The system of claim 9, wherein the first region is 128 by 128 pixels in size.

12. The system of claim 9, wherein the second region is 7 by 7 pixels in size, wherein each pixel is associated with an x-coordinate of the geometric center, a y-coordinate of the geometric center, the radius and the confidence score.

13. The system of claim 9, wherein the machine learning model is trained on annotated ground truth images having a labelled circular region defined by a ground truth geometric center and radius.

14. The system of claim 9, wherein the machine learning model includes at least one regression neural network.

15. The system of claim 14, wherein the regression neural network comprises a plurality of units, and each unit of the plurality of units comprises a number of convolutional layers wherein each convolutional layer is followed by an activation function.

16. The system of claim 9, wherein the machine learning model has been trained on images of balls partially obscured by various objects under various conditions.

17. A non-transitory computer-readable medium having encoded therein programming code executable by a processor to perform operations comprising:

extracting, with a machine learning model, a first region from an image;

pooling, with the machine learning model, the first region to a second region of the image that is smaller than the first region;

predicting, with the machine learning model, a geometric center and radius of a blob of pixels in the second region and a confidence score associated with the predicting; and detecting, with the machine learning model, the blob of pixels as a ball based on the geometric center, the radius and the confidence score, wherein the detecting includes:

classifying the blob of pixels as a ball in the first region if the confidence score meets or exceeds a threshold level; and localizing the ball in the first region based on the predicted geometric center coordinates and radius.

18. The non-transitory computer-readable medium of claim 17, wherein the machine learning model is trained on annotated ground truth images having a labelled circular region defined by a ground truth geometric center and radius.

19. The non-transitory computer-readable medium of claim 17, wherein the machine learning model includes at least one regression neural network.

20. The non-transitory computer-readable medium of claim 19, wherein the regression neural network comprises a plurality of units, and each unit of the plurality of units comprises a number of convolutional layers wherein each convolutional layer is followed by an activation function.

21. The non-transitory computer-readable medium of claim 17, wherein the machine learning model has been trained on images of balls partially obscured by various objects under various conditions.

* * * * *